(12) United States Patent
Dalton et al.

(10) Patent No.: US 6,752,526 B2
(45) Date of Patent: Jun. 22, 2004

(54) COMBINED OPTICAL LIGHT PIPE AND PROTECTIVE ENCLOSURE

(75) Inventors: Bruce T. Dalton, Cornish, ME (US); Eric R. Shute, Buxton, ME (US); Timothy Coste, Standish, ME (US); Kristen Collins, Bridgeton, ME (US)

(73) Assignee: Control Devices, Standish, ME (US)

( * ) Notice: Subject to any disclaimer, the term of this patent is extended or adjusted under 35 U.S.C. 154(b) by 0 days.

(21) Appl. No.: 09/992,320

(22) Filed: Nov. 19, 2001

(65) Prior Publication Data

US 2003/0095418 A1 May 22, 2003

(51) Int. Cl.[7] ................................................. F21V 7/22
(52) U.S. Cl. ..................... 362/582; 362/300; 362/301; 362/307
(58) Field of Search ............................. 362/26, 27, 31, 362/299–301, 307, 327, 551, 560, 582

(56) References Cited

U.S. PATENT DOCUMENTS

| | | | | |
|---|---|---|---|---|
| 3,609,960 A | * | 10/1971 | Huther | .......................... 362/26 |
| 4,625,262 A | * | 11/1986 | Sakakibara et al. | ............ 362/26 |
| 4,954,930 A | * | 9/1990 | Maegawa et al. | .............. 362/26 |
| 4,980,882 A | * | 12/1990 | Baer et al. | ................ 369/275.3 |
| 5,107,107 A | * | 4/1992 | Osborne | ................. 250/231.14 |
| 5,436,805 A | * | 7/1995 | Hsu et al. | ...................... 362/26 |
| 5,884,995 A | * | 3/1999 | Perlo et al. | .................. 362/327 |
| 5,934,782 A | * | 8/1999 | Atkins et al. | ................... 362/26 |
| 6,193,383 B1 | * | 2/2001 | Onikiri et al. | ................. 362/26 |
| 6,240,652 B1 | * | 6/2001 | Bobel et al. | ................... 33/707 |
| 6,379,017 B2 | * | 4/2002 | Nakabayashi et al. | ......... 362/31 |

* cited by examiner

*Primary Examiner*—Alan Cariaso
(74) *Attorney, Agent, or Firm*—Woodard, Emhardt, Moriarty, McNett & Henry LLP

(57) ABSTRACT

A light pipe, including a transparent housing member characterized by a first refractive index, a light source positioned to shine a light beam through the transparent housing member, and at least one enclosed pocket positioned within the transparent member. The enclosed pocket is characterized by a second refractive index, wherein the first refractive index is substantially greater than the second refractive index. Light shining through the transparent member is totally internally reflected by the enclosed pocket.

15 Claims, 5 Drawing Sheets

COMBINED OPTICAL LIGHT PIPE AND PROTECTIVE ENCLOSURE

TECHNICAL FIELD OF THE INVENTION

The present invention relates generally to the field of optics, and more specifically to a combined optical light pipe and protective enclosure.

BACKGROUND OF THE INVENTION

Total internal reflection is an optical phenomenon that occurs when light rays are reflected at the boundary between two transparent media, each having a different index of refraction. Light rays passing through a first transparent medium of relatively high refractive index (optically dense) and arriving at the interface with a second transparent medium of lower refractive index (optically rarer) may be completely reflected within the optically dense medium. Total internal reflection depends on the difference between the refractive indices of the two media and the angle of incidence of the light ray at the interface. The critical angle for total internal reflection is defined as the minimum angle at which a light ray striking the surface of an optically rarer medium will be reflected instead of refracted. Although the reflection is total, the light ray actually penetrates a small distance into the rarer medium.

Total internal reflection can be mathematically expressed by Snell's Law. Snell's Law may be expressed as:

$$\sin á / \sin â = n_2/n_1$$

where $n_1$ is the index of refraction of the optically dense medium, $n_2$ is the index of refraction of the optically rare medium, á is the angle traversed by a beam of light travelling through the first optically dense medium, incident upon the interface and a line erected normal to the point of incidence, and â is the angle between the beam of light refracted into the second optically rare medium and a line erected normal to the point of entry into that medium. For the beam to be totally internally reflected into the first optically dense medium, â must be at least 90 degrees. If â=90 degrees, the beam is reflected parallel to the interface between the two media. If â is greater than 90 degrees, the beam is totally reflected back through the first optically dense medium. The critical angle for total internal reflection, $á_{CRIT}$, is thus:

$$\sin á_{CRIT} / \sin 90° > n_2/n_1$$

or $$á_{CRIT} > \sin^{-1} n_2/n_1$$

A light pipe is a kind of optical waveguide that utilizes the phenomena of total internal reflection to direct light from one point to another. Light pipes are convenient for bending light, directing light around corners, splitting a light beam for delivery to a plurality of destinations, precisely directing light from a specific source to a specific destination, transmitting light signals through environments otherwise hostile to light transmission, insulating light beams from outside interference or scattering, and like applications. Since light pipes operate by the principle of total internal reflection, it is important that the interfacial surface of the light pipe be kept clean. For most light pipes, the optically rarer medium is air. If the optically denser light pipe surface becomes contaminated with a contaminant optically less rare than air, the $n_2/n_1$ value increases and the critical angle $á_{CRIT}$ accordingly increases, allowing for light to escape or "leak" from the light pipe, thereby reducing its efficiency and utility. In extreme cases, optical leakage can result in the catastrophic failure of the light pipe. Therefore, it is necessary to protect the light pipe from such contaminants.

In some applications, there is scant room for the placement of the light pipe. Where miniaturization is necessary, it becomes difficult to provide room for the light pipe itself, and provision of a protective structure is often impossible or prohibitively difficult. One protection technique that is commonly used is to provide an optically rare coating over the optically dense light pipe. However, the interface between the environment (typically air) and the optically rare coating may still be degraded by contaminants such that some leakage still occurs. Coatings are typically thin and more fragile than the underlying light pipe, and may be scratched, abraded, or chemically attacked in their environments. Such coating degradation further decreases the efficiency of the light pipe. Moreover, the addition of a coating increases the cost of the light pipe system. There is therefore a need for a light pipe design that more efficiently utilizes available space without requiring extraneous contaminant protection structures or protective coatings. The present invention addresses this need.

SUMMARY OF THE INVENTION

One embodiment of the present invention is a housing having an optically transparent internal volume of a first refractive index with an optical entry point defined on the surface of the optically transparent volume and an optical transit point defined within the optically transparent volume, and a first pocket formed in the optically transparent volume. The first pocket defines a first three-dimensional negative object within the optically transparent volume having a second refractive index substantially less than the first refractive index. The first pocket is substantially encased by the optically transparent volume and is shaped to reflect a beam of light passing through the optical entry point and incident upon the first pocket to the optical transit point.

One object of the present invention is to provide an improved light pipe. Related objects and advantages of the present invention will be apparent from the following description.

DESCRIPTION OF THE PREFERRED EMBODIMENTS

Figure 1A:
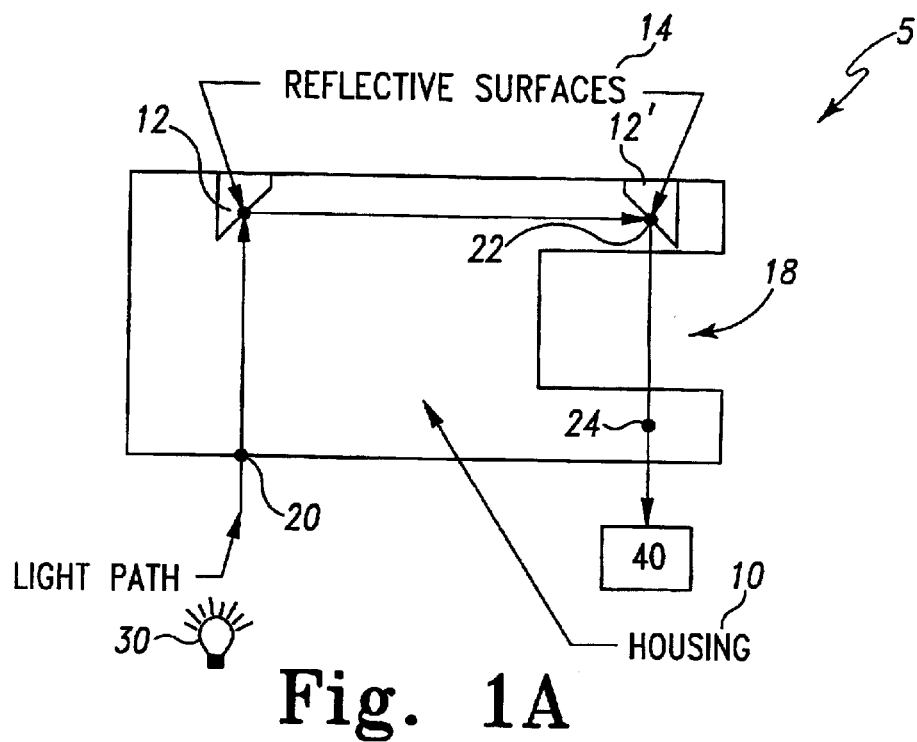
FIG. 1A is a schematic view of a first embodiment of the present invention, a light pipe formed within a housing and having triangular, wedge-shaped reflective pockets formed therein.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1C:
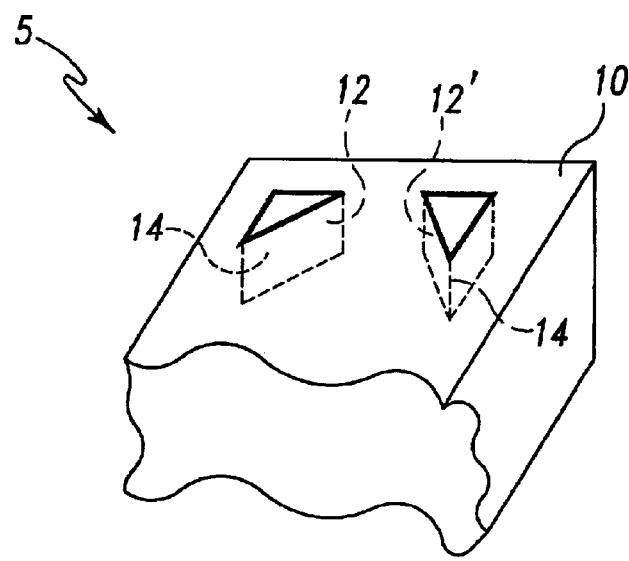
FIG. 1C is a perspective sectional view of the light pipe of FIG. 1A with a portion of the each pocket intersecting the surface of the housing.

FIGS. 1A, 1B, 2A, and 2B illustrate a first embodiment of the present invention, a light pipe 5 formed within a substantially solid housing 10. The housing 10 is preferably formed from a volume of optically transparent material, such as plastic, having a refractive index substantially greater than unity. At least one pocket or cavity 12 is formed within the housing 10. Each pocket 12 may be envisioned as a three-dimensional negative object formed within the confines of the housing 10 (see FIGS. 1B–C and 2B–C). Each pocket 12 is preferably completely encased within the housing 10 (see FIGS. 1B and 2B), although a pocket-forming process may necessitate a portion of the pocket 12 to intersect with the housing surface (see FIGS. 1C and 2C).

Figure 2A:
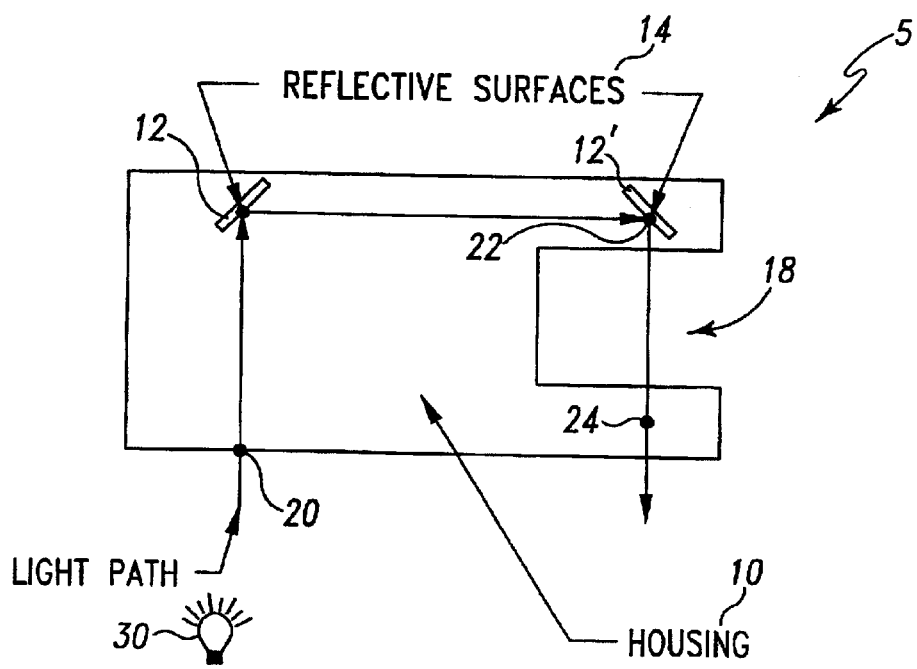
FIG. 2A is a schematic view of a second embodiment of the present invention, a light pipe formed within a housing and rectangular cross-sectioned reflective pockets formed therein.
Figure 1B:
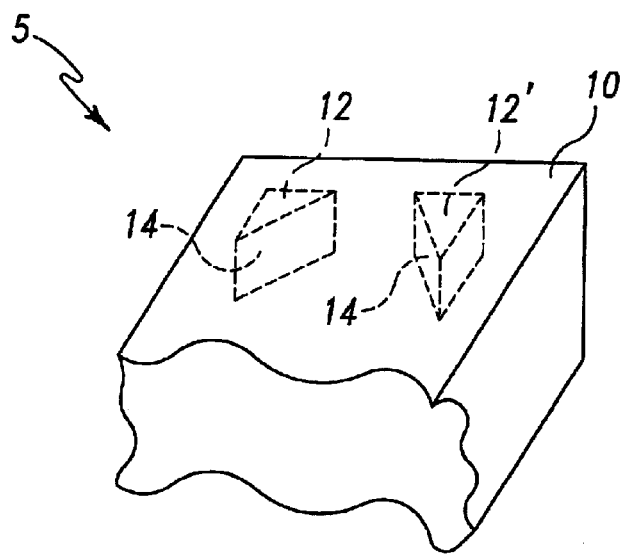
FIG. 1B is a perspective sectional view of the light pipe of FIG. 1A with the pockets substantially encased in the housing.
Figure 2B:
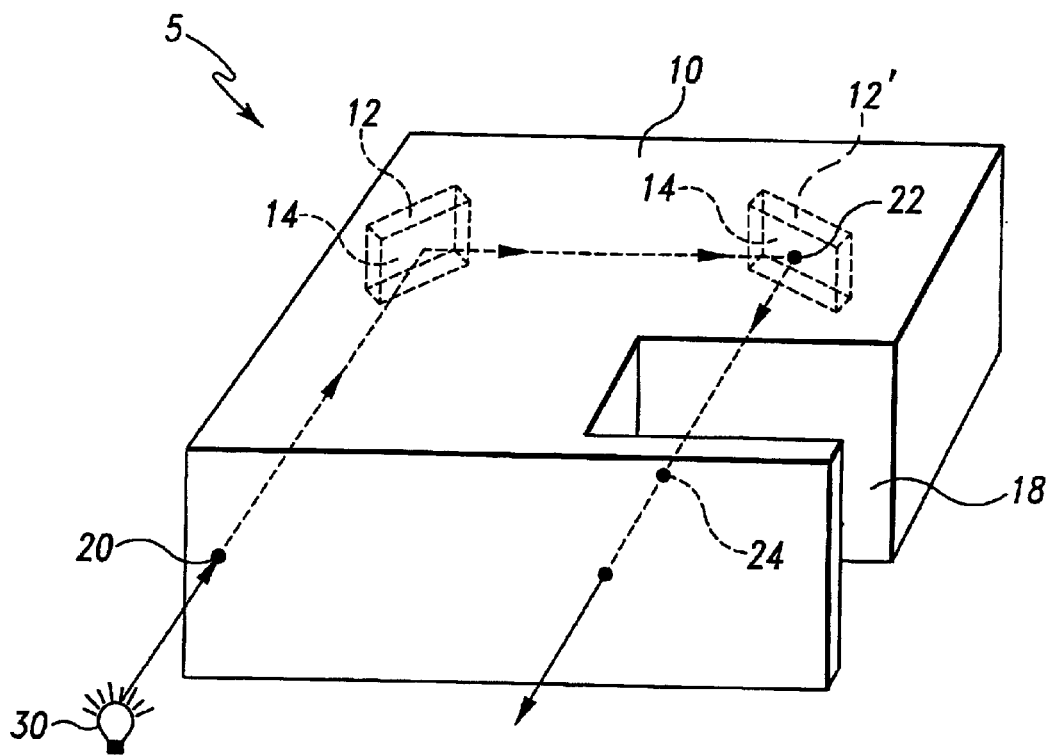
FIG. 2B is a perspective sectional view of the light pipe of FIG. 2A with the pockets substantially encased in the housing.
Figure 2C:
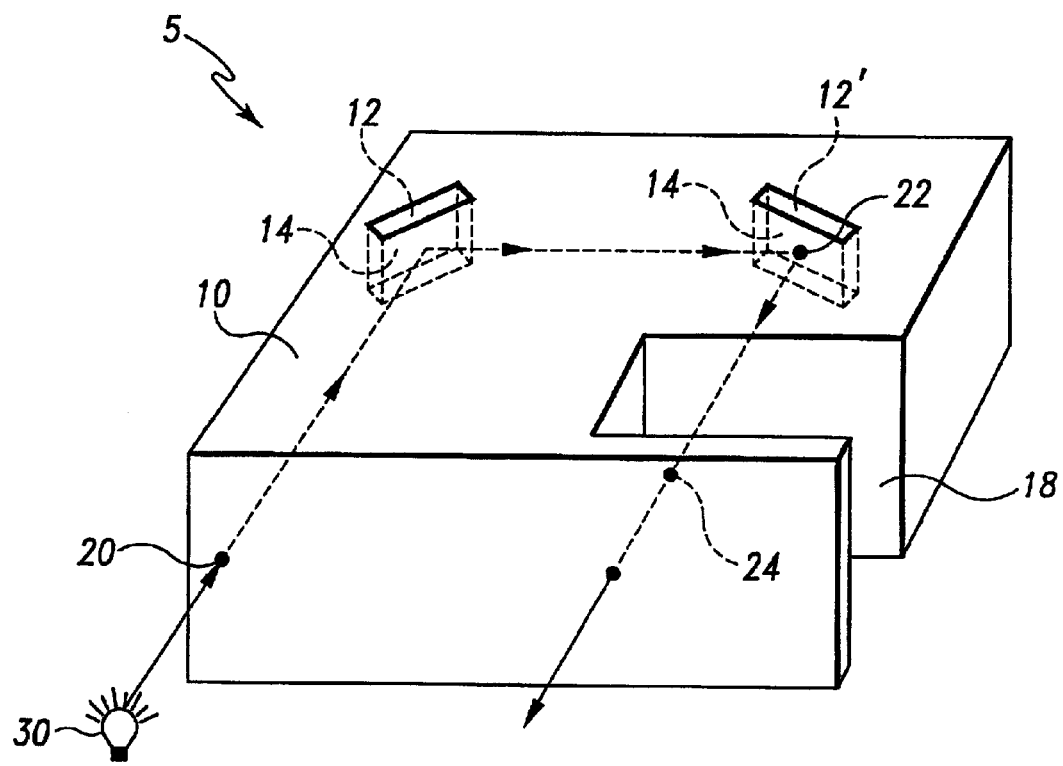
FIG. 2C is a perspective sectional view of the light pipe of FIG. 2A with a portion of the each pocket intersecting the surface of the housing.

The pocket 12 may have any convenient shape, although preferred pocket shapes are regular geometric forms having geometrical cross sectional shapes such as triangles (see FIGS. 1A–C) or rectangles (see FIGS. 2A–C). The pocket 12 preferably includes at least one substantially flat reflecting interfacial surface 14 positioned to redirect incident light through the housing 10. The substantially flat reflecting interfacial surface 14 is preferably positioned entirely within the boundaries of the housing 10, such that any external contaminants, such as dirt, dust, body oil, grease, or the like cannot come into contact therewith.

The refractive index of the pocket 12 is preferably close to 1.0 or unity, and is more preferably substantially equal to unity. The pocket 12 is preferably filled with an optically rare optical medium, for example a gas (such as air) or a partial vacuum, but may be filled with any relatively optically rare medium. The refractive index of the housing 10 is preferably at least about 1.2 and is more preferably about 1.5. However, the housing 10 may be selected to have any convenient refractive index such that light passing therethrough is totally internally reflected by the pocket 12.

The housing 10 is preferably shaped to provide at least one recess or hollow 18 into which an object to be housed may be placed. The recess 18 is at least partially enclosed by the housing 10, such that the interior of the recess 18, as well as an object placed therein, enjoys a modicum of protection from the outside environment.

The housing 10 further includes an optical entry point 20 defined on or below its surface, at least one optical transit point 22 defined within the housing 10, and an optical exit point 24 defined on or in the housing 10. The optical entry point 20 is preferably a point positioned between a light source 30 positioned exterior to the housing 10 and the reflective interfacial surface 14 of the first pocket 12, such that a light beam shining from the light source 30 through the optical entry point 20 strikes the first pocket 12 and is totally internally reflected therefrom toward a desired destination. In other words, a light beam travelling from a pre-positioned light source 30 through the optical entry point 20 and striking the reflective interfacial surface 14 of the first pocket 12 is redirected through a known angle towards a predetermined target. This target is designated the optical transit point 22 for convenience. Light emerging through the optical exit point 24 may be directed towards some light detecting device, such as a human eye or a photodetector 40. The housing 10 is preferably at least partially coated with an opaque material (or at least partially encased in an opaque casing) to minimize optical interference from external light sources.

In the illustrated embodiment, a second pocket 12' is positioned such that the optical transit point 22 is immediately adjacent its reflective interfacial surface 14. The light beam from the first pocket 12 intersects the optical transit point 22 and is then redirected via total internal reflection by the second pocket 12'. The optical exit point 24 is defined to be a point in or on the housing 10 through which the light beam passes after it has been redirected for the last time by a pocket 12. In this embodiment, the optical exit point 24 is on a path between the second pocket 12', the recess 18, and the exterior of the housing 10. The light beam, if allowed to travel uninterrupted through the recess 18, therefore traces a path from the light source 30 to the first pocket 12, the second pocket 12', across the recess 18, and out of the housing 10.

Since the reflective surfaces 14 of the light pipe 5 are all located within its interior, those reflective surfaces 14 are well shielded from dust and other like contaminants and remain substantially clean. Therefore, the reflective surfaces 14 are not degraded by contamination and the capacity for total internal reflection within the light pipe 5 is not diminished over time.

Figure 3:
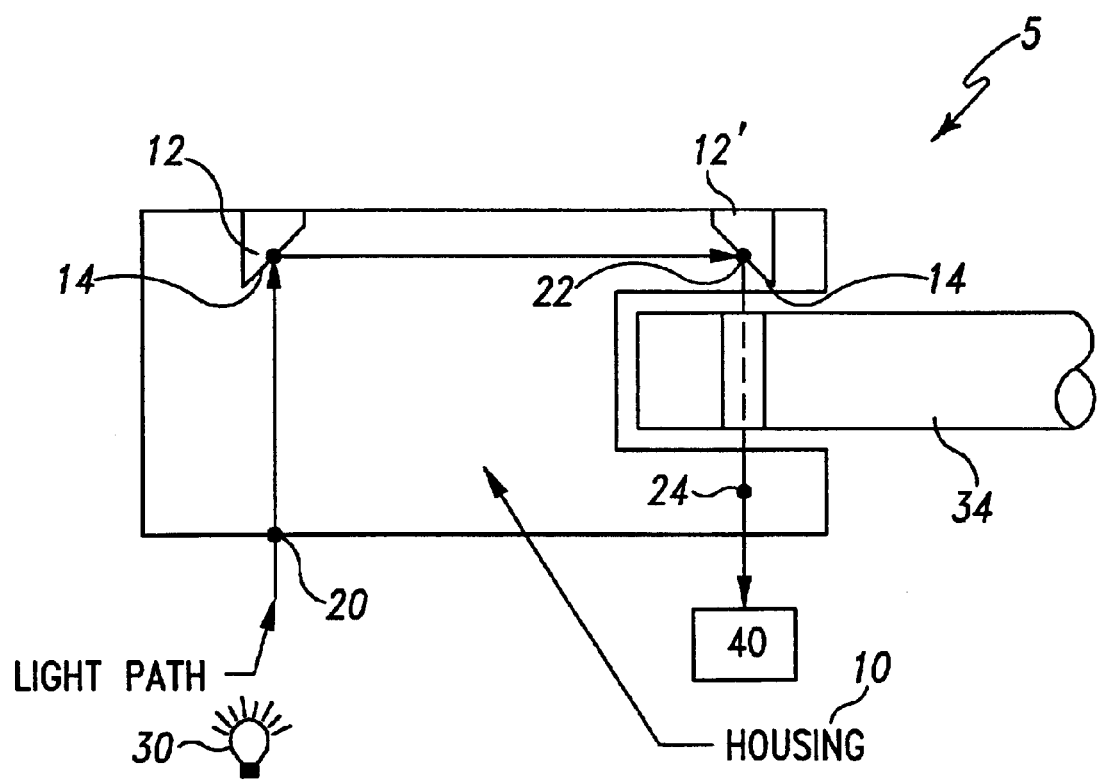
FIG. 3 is a schematic view of a third embodiment of the present invention, the light pipe of FIG. 1A and having an optical device operationally connected within a recess formed in the housing.
Figure 4:
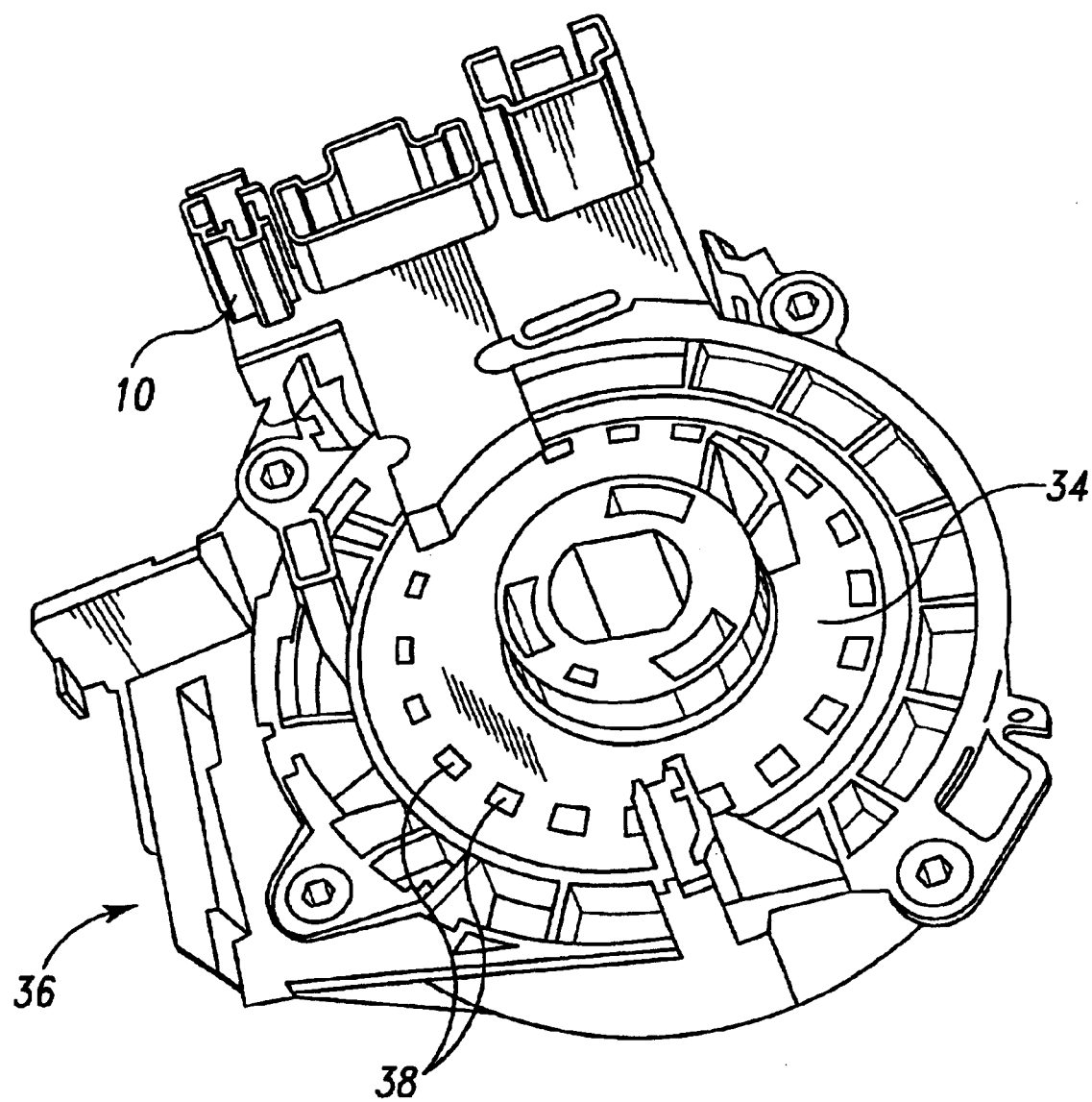
FIG. 4 is a perspective view of the embodiment of FIG. 3.

FIGS. 3 and 4 illustrate a third embodiment of the present invention, a light pipe 5 as described generally above, but further comprising an optical device positioned in the recess 18. In this embodiment, the optical device is the rotary encoder wheel 34 portion of an automotive clockspring 36. The encoder wheel 34 has a number of linear apertures 38 formed therethrough and positioned near the edge of the wheel 34. A portion of the wheel 34 is positioned in the recess 18, such that rotation of the wheel 34 about its axis rotates the linear apertures 38 through the recess 18. The wheel 34 is further positioned such that each linear aperture 38 rotates through a the line drawn between the optical transit point 22 and the optical exit point 24. The linear apertures 38 are further oriented such that their major axes are parallel with a line drawn between the optical transit point 22 and the optical exit point 24, and are preferably colinear with such a line. In other words, as the encoder wheel 34 rotates, apertures 38 are alternately presented to the recess 18 such that a light beam reflected from a pocket 12' periodically passes through an aperture 38, such that to an observer on the other side of the aperture 18 from the pocket 12' the periodic transmission of the light beam through an aperture 38 would appear as a flicker. A photodetector 40 may be positioned opposite the encoder wheel 34 from the optical exit point 24 and in the path of the light beam periodically passing through an aperture 38 to count the flickers. By counting the 'flickers', such information as the degree of rotation and the rotation speed of the encoder wheel 34, and of any mechanical device the encoder wheel 34 is coupled to (such as a steering column), may be determined.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A housing comprising:
   an optically transparent volume having a first refractive index;
   an optical entry point defined on the surface of the optically transparent volume;
   an optical transit point defined within the optically transparent volume; and
   a first pocket formed in the optically transparent volume;
   wherein the first pocket defines a first three-dimensional negative object within the optically transparent volume having a second refractive index substantially less than the first refractive index;
   wherein the first pocket is substantially encased by the optically transparent volume; and
   wherein the first pocket is shaped to reflect a beam of light passing through the optical entry point and incident upon the first pocket to the optical transit point; and
   wherein the first pocket encloses a partial vacuum.

2. The housing of claim 1 wherein the first pocket is filled with a gas.

3. The housing of claim 2 wherein the gas is air.

4. The housing of claim 1 wherein the refractive index of the first pocket is substantially unity.

5. A housing comprising:
   an optically transparent volume having a first refractive index;
   an optical entry point defined on the surface of the optically transparent volume;
   an optical transit point defined within the optically transparent volume; and
   a first pocket formed in the optically transparent volume;
   a second pocket formed in the optically transparent volume; and
   an optical exit point defined within the optically transparent volume;
   wherein the first pocket defines a first three-dimensional negative object within the optically transparent volume having a second refractive index substantially less than the first refractive index;
   wherein the first pocket is substantially encased by the optically transparent volume;
   wherein the first pocket is shaped to reflect a beam of light passing through the optical entry point and incident upon the first pocket to the optical transit point; and
   wherein the second pocket defines a second three-dimensional negative object within the optically transparent volume having a third refractive index substantially less than the first refractive index;
   wherein the second pocket is substantially encapsulated by the optically transparent volume; and
   wherein the second pockets is shaped to totally internally reflect a beam of light from the first pocket passing through the optical transit point and incident upon the second pocket to the optical exit point.

6. The housing of claim 5 wherein the first and second pockets are filled with air.

7. The housing of claim 5 wherein the second and third refractive indices are substantially unity.

8. A housing comprising:
   an optically transparent volume having a first refractive index;
   an optical entry point defined on the surface of the optically transparent volume;
   an optical transit point defined within the optically transparent volume; and
   a first pocket formed in the optically transparent volume;
   a second pocket formed in the optically transparent volume; and
   an optical exit point defined within the optically transparent volume;
   a hollow recess positioned between the optical transit point and the optical exit point;
   wherein the first pocket defines a first three-dimensional negative object within the optically transparent volume having a second refractive index substantially less than the first refractive index;
   wherein the first pocket is substantially encased by the optically transparent volume;
   wherein the first pocket is shaped to reflect a beam of light passing through the optical entry point and incident upon the first pocket to the optical transit point; and
   wherein the second pocket defines a second three-dimensional negative object within the optically transparent volume having a third refractive index substantially less than the first refractive index;
   wherein the second pocket is substantially encapsulated by the optically transparent volume; and
   wherein the second pockets is shaped to reflect a beam of light from the first pocket passing through the optical transit point and incident upon the second pocket to the optical exit point.

9. The housing of claim 8 further comprising an optical device and wherein at least a portion of the optical device is positioned within the hollow recess.

10. The housing of claim 9 wherein the optical device is a rotary encoder.

11. The housing of claim 9 wherein the optical device is part of an automotive clockspring.

12. A combination, comprising:
    a substantially solid transparent body having a first refractive index;
    a first cavity formed within the substantially solid transparent body; and
    a second cavity formed within the substantially solid transparent body
    a first optical medium substantially filling the first cavity;
    a second optical medium substantially filling the second cavity;
    a light source positioned to shine a beam of light through the substantially solid transparent body to the first cavity; and
    a recess formed in the substantially solid transparent body;
    wherein the first optical medium is having a second refractive index substantially less than the first refractive index; and
    wherein the first cavity is adapted to redirect incident light shining through the substantially solid transparent body through a first predetermined angle; and wherein the second optical medium has a third refractive index substantially less than the first refractive index; and wherein the recess is positioned such that light redirected from the second cavity shines through the recess.

13. The combination of claim 12 further comprising an optical device positioned in the recess.

14. The combination of claim 13 wherein the optical device includes an encoder wheel adapted to periodically transmit a light beam therethrough and a photodetector positioned to detect the periodic transmission of a light beam through the encoder wheel.

15. A light pipe, comprising:

a transparent member having a first refractive index;

a light source positioned to shine a light beam through the transparent member; and at least a first and second enclosed pockets positioned within the transparent member;

wherein the first and second enclosed pockets have a second and third refractive indices, respectively;

wherein the first refractive index is substantially greater than the second refractive index and third refractive index; and wherein light shining through the transparent member is totally internally reflected by the first pocket directly to the second enclosed pocket.

* * * * *